United States Patent

[11] 3,576,562

[72] Inventor Boris Sakic
Wettingen, Switzerland
[21] Appl. No. 620,519
[22] Filed Mar. 3, 1967
[45] Patented Apr. 27, 1971
[73] Assignee Aktiengesellschaft Brown, Boveri & Cie
Baden, Switzerland
[32] Priority Mar. 23, 1966
[33] Switzerland
[31] 4199/66

[54] DECODING ARRANGEMENT FOR BINARY CODE DECIMAL GROUPS

4 Claims, 3 Drawing Figs.

[52] U.S. Cl. 340/347, 235/155
[51] Int. Cl. H03k 13/243
[50] Field of Search 340/347 (D-D); 235/154; 307/215; 235/155; 328/119

[56] References Cited
UNITED STATES PATENTS
3,052,411 9/1962 Boese et al. 235/155

*Primary Examiner*—Maynard R. Wilbur
*Assistant Examiner*—Charles D. Miller
*Attorney*—Pierce, Scheffler and Parker

ABSTRACT: A decoder for decimal-grouped binary codes has four input channels corresponding to the binary positions for parallel feeding in of signals to be decoded and 10 output channels corresponding to the decimal digits for transmitting the decoded signals. Logic circuits, all of the same type, i.e. either NAND or NOR gates, are provided respectively for each of the 10 output channels.

PATENTED APR 27 1971 3,576,562

INVENTOR

Boris Sakic

By Pierce, Scheffler & Parker
Attorneys

INVENTOR
Boris Sakic
By Pierce Scheffler & Parker
Attorneys

DECODING ARRANGEMENT FOR BINARY CODE DECIMAL GROUPS

The present invention concerns a decoder, particularly for decimal-grouped binary codes with four inputs corresponding to the binary positions for the parallel feeding in of the signals to be decoded and with 10 outputs corresponding to the decimal digits for transmitting the decoded signals.

Since the output signals of these decoders are used mostly for modulating an indicating or recording device, for example, a printer, it is of advantage to form the outputs by amplifier outputs. This is the case, for example, in decoders where each output is formed by the output of an associated logic circuit serving as an amplifier.

The accompanying drawings illustrate such logic circuits. In these drawings.

Figure 1:
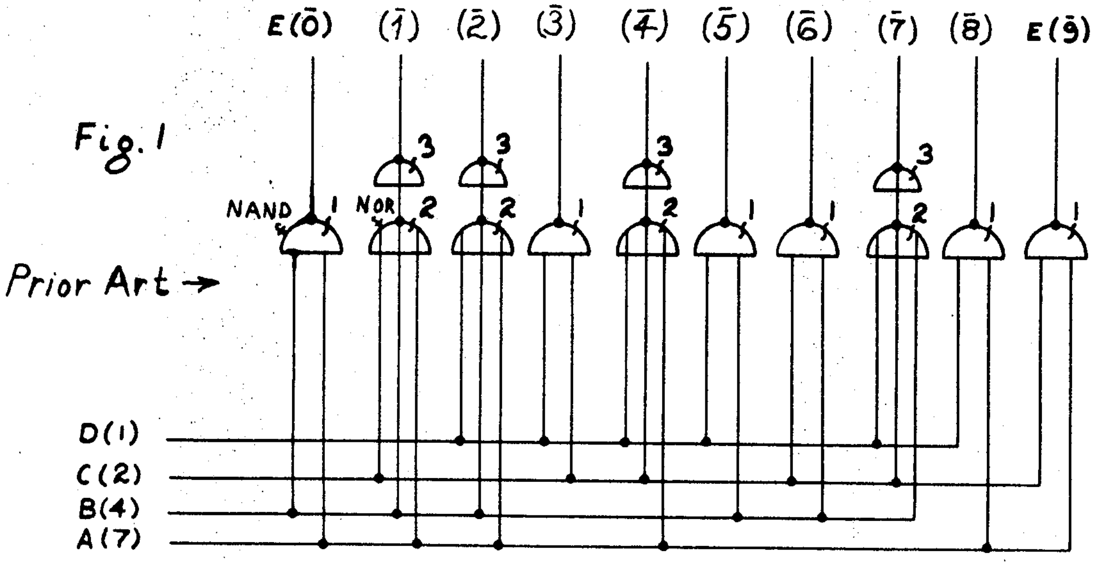
FIG. 1 is a schematic view of a decoder arrangement using logic circuits in accordance with the teaching of the prior art.

Referring now to the known decoder arrangement illustrated in FIG. 1, the binary code is provided with weight steps of 7, 4, 2 and 1, according to the following table:

| | ABCD |
|---|---|
| 0 | LLOO |
| 1 | OOOL |
| 2 | OOLO |
| 3 | OOLL |
| 4 | OLOO |
| 5 | OLOL |
| 6 | OLLO |
| 7 | LOOO |
| 8 | LOOL |
| 9 | LOLO |

The binary signals are therefore fed in parallel over the four inputs A (7), B (4), C (2) and D (1), while the outputs E ($\bar{0}$) to E ($\bar{9}$) transmit the inverted signals corresponding to the decimal digits. In this code the decimal digits 0, 3, 5, 6, 8, 9 are determined by binary characters of a first type, which are already unmistakably associated with the decimal digits by identical symbol (namely L symbols) for an increment of the binary positions (namely in two positions). The respective logic circuits are therefore realized by NAND gates 1. The other decimal digits 1, 2, 4, 7 are determined by 0 signals in the binary positions. Their respective logic circuits were therefor OR gates. Because of the necessity of an identical output of all logic circuits, however, NOR gates 2 are used with series-connected inversion amplifiers 3, which represents a considerable expenditure. These decoders have moreover the disadvantage that they have two different types of logic elements which represent the different loads for the input signals.

It is the object of the invention to provide a decoder for a binary code which has such characters of a first type, but which does not have the above mentioned disadvantages.

The decoder according to the invention is characterized in that 10 logic elements of the same type, for example, NAND gates, are provided which are associated with the binary characters and whose outputs form the outputs of the decoder, that the inputs of certain of the logic elements associated with the binary characters of the first type are connected with those inputs of the decoder whose associated binary positions conform, with identical symbols, for unmistakable association of the corresponding decimal digits, and that a part of the inputs of each of the remaining logic elements is connected with selected inputs of the decoder which carry identical signals for the binary character associated with these logic elements and for an increment of the remaining binary characters associated with this binary symbol, while the other inputs of these remaining logic elements are connected with those outputs of the decoder which belong to the binary characters of this associated increment.

The invention will be described more fully in relation to the different embodiments of FIGS. 2 and 3.

Figure 2:
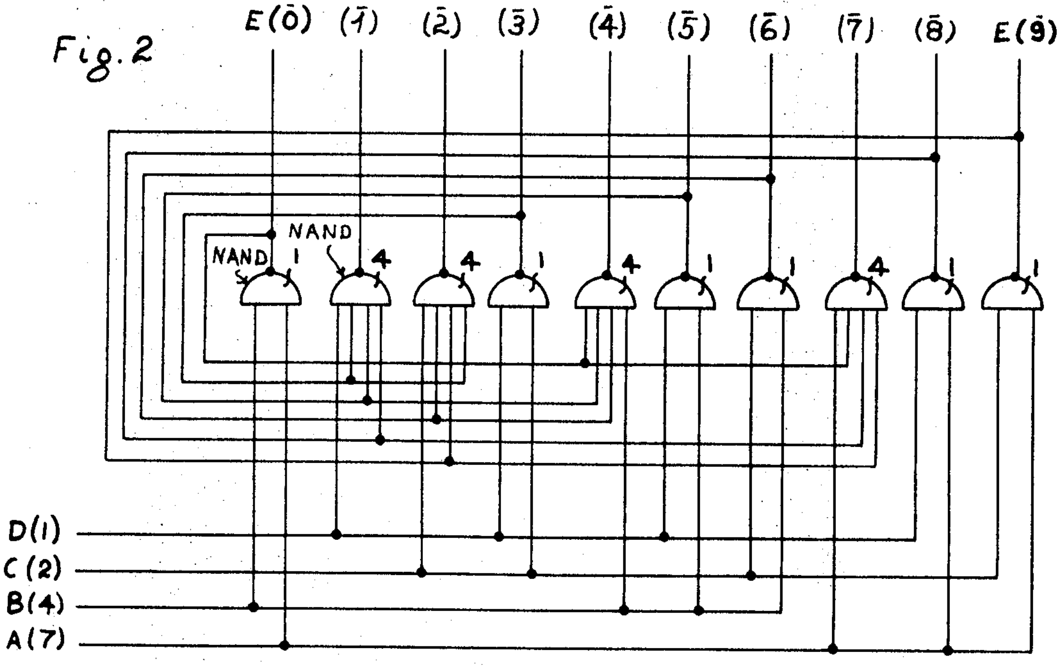
FIG. 2 is a similar view illustrating one embodiment of an improved decoder for one code in accordance with the present invention.

FIG. 2 shows a decoder which is laid out for the same code as the known decoder arrangement according to FIG. 1. The decimal digits belonging to the binary characters of the first type, namely, 0, 3, 5, 6, 8 and 9, are formed, as in the known device according to FIG. 1, by NAND gates 1. For determining the logic elements belonging to the other decimal digits it is necessary to find for each binary character the increment of all those binary characters which have L symbols in the same binary positions as the binary character under consideration. The logic connection which the binary character under consideration shows consists then in the statement that L symbols exist in the respective binary positions and that the decimal digits of the associated increment of the binary characters do not exist.

Since the outputs of the decoder, which carry L symbols, are to represent inverted outputs for the example under consideration, when the associated decimal digits do not exist, the other logic elements must also be so laid out that they realize the inverted state with regard to the foregoing statement. This requirement is met in this way that the logic elements belonging to the decimal digits 1, 2, 4, 7 are formed each by a NAND gate 4, a part of its inputs being connected with selected inputs of the decoder A, B, C or D, which carry the binary character associated with this NAND gate 4, and the binary character associated with the associated increment L, while the other inputs of the NAND gate 4 are connected with the outputs of the decoder which belong to the binary characters of this associated increment.

The following table indicates in the second column, the binary positions selected for the decimal digits 1, 2, 4, 7 which have in the associated binary characters an L symbol, and in the third column the associated increment represented by the respective decimal digits.

| | | |
|---|---|---|
| 1 | D | 3, 5, 8 |
| 2 | C | 3, 6, 9 |
| 4 | B | 0, 5, 6 |
| 7 | A | 0, 8, 9 |

This results in the wiring according to FIG. 2.

Figure 3:
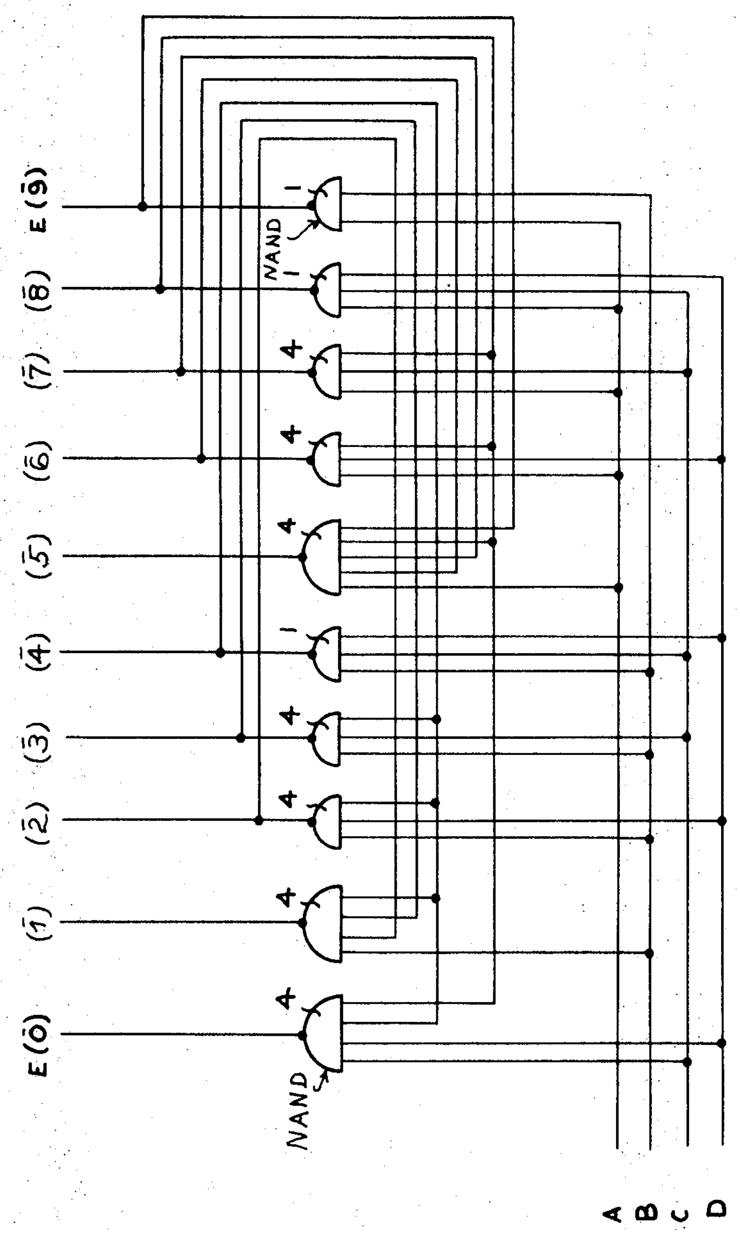
FIG. 3 is a similar view showing another embodiment of an improved decoder according to the present invention adapted for a different code, namely, a so-called 3-excess code.

FIG. 3 contains another example of the decoder according to the invention for the so-called 3-excess code, which is reproduced in the following table:

| | ABCD |
|---|---|
| 0 | OOLL |
| 1 | OLOO |
| 2 | OLOL |
| 3 | OLLO |
| 4 | OLLL |
| 5 | LOOO |
| 6 | LOOL |
| 7 | LOLO |
| 8 | LOLL |
| 9 | LLOO |

Binary characters of the first type are associated in this code with the decimal digits 4, 8 and 9. The logic elements belonging to these decimal digits are NAND gates 1, whose inputs are all connected with the inputs A, B, C, D of the decoder circuit. For the other decimal digits 0, 1, 2, 3, 5, 6, 7 the following table contains in the second column the selected binary positions which have in the associated binary characters an L symbol, and in the third column the associated increment represented by the respective decimal digits.

| | | |
|---|---|---|
| 0 | CD | 4, 8 |
| 1 | B | 2, 3, 4 |
| 2 | BD | 4 |
| 3 | BC | 4 |
| 5 | A | 6, 7, 8, 9 |
| 6 | AD | 8 |
| 7 | AC | 8 |

From this table results the wiring of the other logic elements, namely, of the NAND gates 4.

As it can be readily seen from the general rule concerning the equivalence of logic circuits, it is possible to use NOR gates instead of NAND gates with corresponding inversion of the inputs and outputs of the decoder.

I claim:

1. Decoder, particularly for decimal-grouped four-digit binary codes with four input lines corresponding to the binary positions for the parallel feeding of the signals to be decoded, and with ten outputs corresponding to the decimal digits for emitting the decoded signals, where the binary code contains characters of a first type which are already clearly associated with a decimal digit by identical symbols for some of the binary positions, while the other characters of the binary code are characters of a second type, which would not yet permit a clear association with decimal digits in the case of identical symbols for the remaining binary positions, the improvement comprising 10 logic elements of the NOR-NAND type associated with the binary positions whose outputs correspond to the decoded decimal positions, the inputs of the logic elements associated with the binary characters of the first type being connected with those input lines of the decoder whose associated binary positions suffice for the definite association with decimal digits in the case of identical symbols, a portion of the inputs of one logic element associated with a binary character of the second type being connected with input lines of the decoder while the remaining inputs to said one logic element are connected to outputs of other logic elements, said other logic elements being selected such that they are connected with at least a portion of their inputs with decoder input lines which are the same as those input lines connected with the first inputs of said one logic element.

2. A decoder as defined in claim 1 wherein said logic elements are NAND gates.

3. Decoder, particularly for decimal-grouped four-digit binary codes with four input lines corresponding to the binary positions for the parallel feeding of the signals to be decoded, and with 10 outputs corresponding to the decimal digits for emitting the decoded signals, where the binary code contains characters of a first type which are already clearly associated with a decimal digit by identical symbols for some of the binary positions, while the other characters of the binary code are characters of a second type, which would not yet permit a clear association with decimal digits in the case of identical symbols for the remaining binary positions, the improvement comprising 10 logic elements of the NOR-NAND type associated with the binary positions whose outputs correspond to the decoded decimal positions, the inputs of the logic elements associated with the binary characters of the first type being connected to two input lines of the decoder whose associated binary positions suffice for the definite association with decimal digits in the case of identical symbols, a portion of the inputs of one logic element associated with a binary character of the second type being connected with one input line of the decoder while the remaining inputs to said one logic element are connected to outputs of other logic elements, said other logic elements being selected such that they are connected with the decoder input line which is the same as the decoder input line connected with the first input of said one logic element.

4. Decoder, particularly for decimal-grouped four-digit binary codes with four input lines corresponding to the binary positions for the parallel feeding of the signals to be decoded, and with 10 outputs corresponding to the decimal digits for emitting the decoded signals, where the binary code contains characters of a first type which are already clearly associated with a decimal digit by identical symbols for some of the binary positions, while the other characters of the binary code are characters of a second type, which would not yet permit a clear association with decimal digits in the case of identical symbols for the remaining binary positions, the improvement comprising 10 logic elements of the NOR-NAND type associated with the binary positions whose outputs correspond to the decoded decimal positions, the inputs of the logic elements associated with the binary characters of the first type being connected with at least two input lines of the decoder whose associated binary positions suffice for the definite association with decimal digits in the case of identical symbols, a portion of the inputs of one logic element associated with a binary character of the second type being connected with at least one input line of the decoder while the remaining inputs to said one logic element are connected to outputs of other logic elements, said other logic elements being selected such that they are connected with at least one decoder input line which is the same as the at least one decoder input line connected with the first inputs of said one logic element.